(12) United States Patent
Bohnet et al.

(10) Patent No.: US 8,794,888 B2
(45) Date of Patent: Aug. 5, 2014

(54) FIXING ELEMENT

(75) Inventors: Hartmut Bohnet, Waldachtal (DE);
Jochen Kaupp, Waldachtal (DE);
Roland Unterweger, Pfalzgrafenweiler (DE); Paul Schmieder, Stuttgart (DE)

(73) Assignee: fischerwerke GmbH & Co. KG, Waldachtal (DE)

( * ) Notice: Subject to any disclaimer, the term of this patent is extended or adjusted under 35 U.S.C. 154(b) by 174 days.

(21) Appl. No.: 13/514,221

(22) PCT Filed: Dec. 1, 2010

(86) PCT No.: PCT/EP2010/007291
§ 371 (c)(1),
(2), (4) Date: Jun. 6, 2012

(87) PCT Pub. No.: WO2011/072805
PCT Pub. Date: Jun. 23, 2011

(65) Prior Publication Data
US 2012/0237313 A1 Sep. 20, 2012

(30) Foreign Application Priority Data

Dec. 16, 2009 (DE) .......................... 10 2009 059 158
Oct. 29, 2010 (DE) .......................... 10 2010 060 259
Nov. 24, 2010 (DE) .......................... 10 2010 060 771

(51) Int. Cl.
*F16B 13/06* (2006.01)

(52) U.S. Cl.
USPC ............................ 411/57.1; 411/60.1; 411/61

(58) Field of Classification Search
USPC ................. 411/57.1, 60.1, 60.2, 60.3, 61–63, 411/65–67, 544, 547
See application file for complete search history.

(56) References Cited

U.S. PATENT DOCUMENTS

| 3,171,322 A | * | 3/1965 | Kaplan ........................ 411/60.1 |
| 5,569,091 A | | 10/1996 | Haage et al. |
| 5,634,750 A | | 6/1997 | Frishmann et al. |
| 6,270,303 B1 | * | 8/2001 | Gauthier et al. ............. 411/60.1 |
| 6,309,155 B1 | | 10/2001 | Huang |

(Continued)

FOREIGN PATENT DOCUMENTS

| CN | 2450430 Y | 9/2001 |
| CN | 24595839 Y | 6/2002 |

(Continued)

OTHER PUBLICATIONS

International Search Report for corresponding International Application No. PCT/EP2010/007291 mailed Feb. 18, 2011.

(Continued)

*Primary Examiner* — Gary Estremsky
(74) *Attorney, Agent, or Firm* — Renner, Otto, Boisselle & Sklar, LLP

(57) ABSTRACT

The invention relates to a fixing element (1) for anchoring in an undercut drilled hole. The fixing element (1) has a shank portion (2) and an expansion element (3), there being arranged on the shank portion (2) an expander body (8) for expanding the expansion element (3) and a load-application means (7). The expansion element (3) is sleeve-like, having at its end that is at the rear in the direction of introduction (E) a ring-shaped main body (13) at the introduction end of which there is arranged an expansion lobe (10) having an opening (17).

12 Claims, 4 Drawing Sheets

(56) References Cited

U.S. PATENT DOCUMENTS

| | | | |
|---|---|---|---|
| 6,600,632 B1 * | 7/2003 | Prochazka et al. | 360/264.1 |
| 6,676,348 B2 * | 1/2004 | Hoppe | 411/48 |
| 6,705,813 B2 * | 3/2004 | Schwab | 411/526 |
| 2009/0097939 A1 * | 4/2009 | Ayrle | 411/57.1 |

FOREIGN PATENT DOCUMENTS

| | | |
|---|---|---|
| CN | 2725607 Y | 9/2005 |
| CN | 2821010 Y | 9/2006 |
| CN | 2821011 Y | 9/2006 |
| DE | 30 31 048 A1 | 3/1982 |
| DE | 40 11 229 A1 | 8/1991 |
| DE | 295 01 182 U1 | 3/1995 |
| DE | 4402478 A1 | 8/1995 |
| DE | 4435628 A1 | 4/1996 |
| WO | 99/02869 A1 | 1/1999 |

OTHER PUBLICATIONS

International Preliminary Report on Patentability for corresponding International Application No. PCT/EP2010/007291 dated Jul. 4, 2012.

* cited by examiner

Fig. 1
Fig. 2
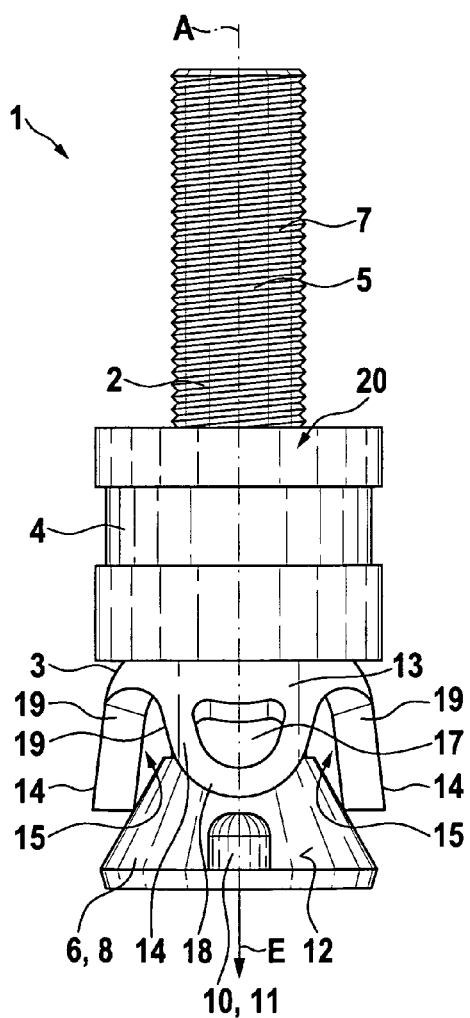
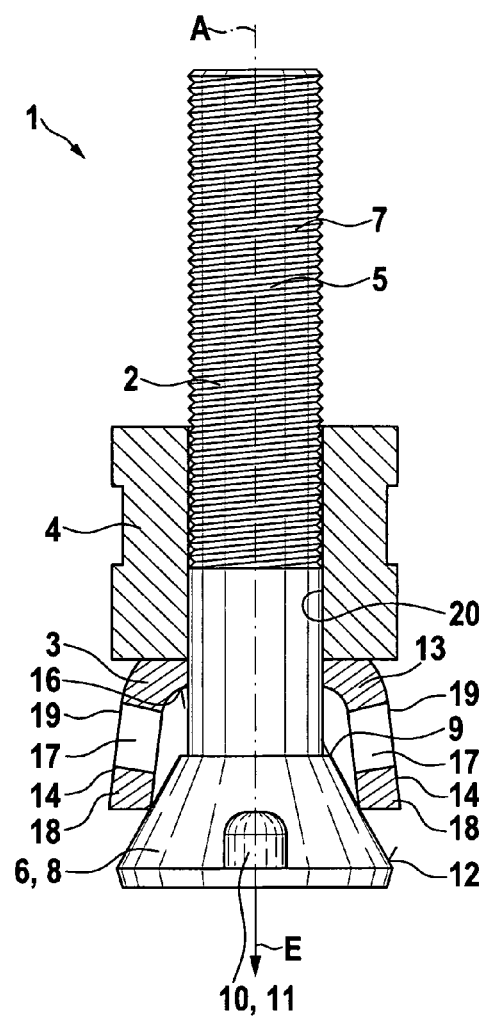

Fig. 3
Fig. 4
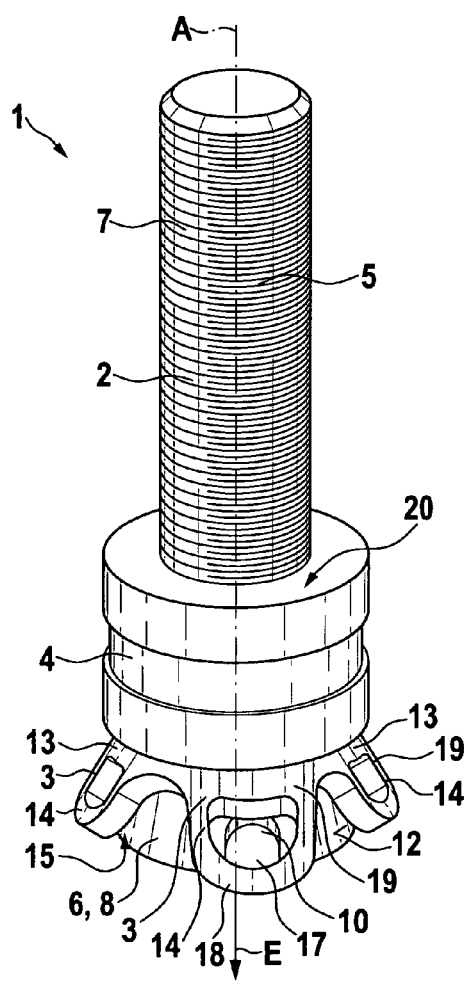
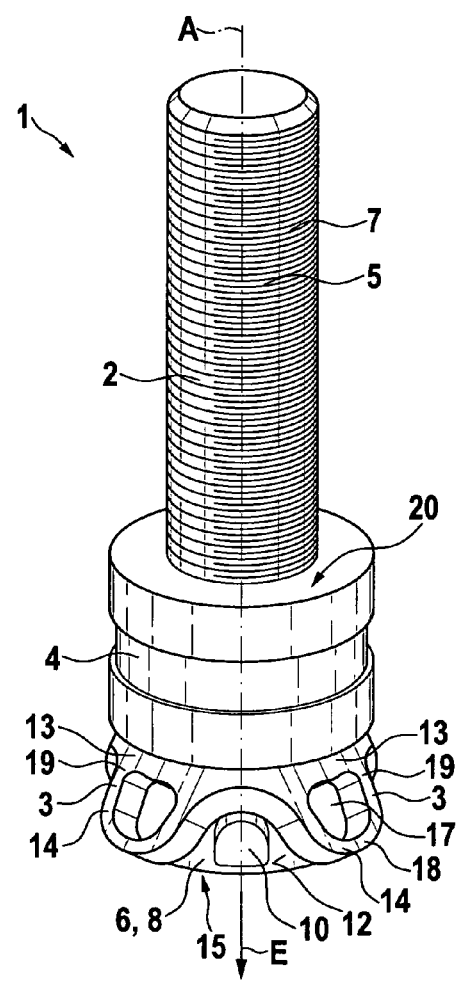

FIXING ELEMENT

DISCUSSION OF RELATED ART

A fixing element of that kind for anchoring in an undercut drilled hole is known from German Offenlegungsschrift DE 40 11 229 A1. The fixing element described in that specification is especially suitable for fixing panel-like structural elements, for example natural stone panels, to a load-bearing structure. The fixing element is in the form of an undercut anchor and has a shank portion and an expansion element. On the shank portion, at its end at the front in the direction of introduction, there is arranged a conical expander body with which the ring-shaped or sleeve-like expansion element can be expanded. The shank portion has, in addition, a load-application means on a rear part. The expansion element is formed by a sleeve-like metal ring of roof-like construction having the shape of a pent roof or having a plurality of portions bent into a roof shape.

On the shank portion of the fixing element there is arranged, in addition, an expansion sleeve. If the expansion sleeve is moved in the axial direction along the shank portion in the direction of the conical expander body, the expansion sleeve presses the expansion element over the conical expander body which widens in the direction of introduction, with the result that the ring is expanded in such a way that it at least partially fills the undercut of the undercut drilled hole. As a result of the expansion of the expander body, the fixing element is anchored interlockingly in the drilled hole. Accordingly, by means of the fixing element, forces can be transmitted from the panel-like structural element to the load-bearing structure, to which the fixing element is joined by means of the load-application means which takes the form of an external thread.

SUMMARY OF THE INVENTION

The problem of the invention is to provide an alternative fixing element.

That problem is solved according to the invention by a fixing element having the features of claim 1. The fixing element according to the invention for anchoring in an undercut drilled hole comprises a shank portion and an expansion element. The shank portion has an expander body for expanding the expansion element and a load-application means. The expander body is especially in the form of a conical portion which widens in the direction of introduction and which is arranged at the end of the shank portion that is at the front in the direction of introduction. The load-application means is, for example, in the form of an external thread. The expansion element is sleeve-like, "sleeve-like" meaning that the expansion element substantially surrounds the shank portion in the circumferential direction. The expansion element is especially closed in the circumferential direction. "Direction of introduction" and "introduction end" are to be understood as being the direction and the end, respectively, into which and with which the fixing element is inserted into a drilled hole.

A characteristic of the fixing element according to the invention is the special form of the expansion element. The expansion element has a ring-shaped main body at the introduction end of which there is arranged at least one expansion lobe. The ring-shaped main body is especially arranged at the end of the expansion element that is at the rear in the direction of introduction. Preferably the ring-shaped main body is itself closed. "Expansion lobe" is to be understood as being an element which, on expansion of the expansion element, is moved radially outwards away from the ring-shaped main body. If the fixing element is located in an undercut drilled hole and if the expansion element is pressed against the expander body, for example by means of an expansion sleeve, the expansion lobe is moved radially outwards by the conically widening expander body in such a way that the expansion lobe engages in and at least partially fills the undercut. The expansion lobe has an opening in the form of an aperture that is surrounded on all sides and which is especially arranged in such a way that it reduces the cross-section of the expansion lobe in the region of its connection to the ring-shaped main body, the opening being located inside the expansion lobe, so that when the expansion lobe is spread open the opening is substantially moved outwards with the expansion lobe. The opening can be arranged, in particular, in a region of the expansion lobe that faces the main body, so that the opening is surrounded by the expansion lobe and by the main body. As a result, there is created on the expansion lobe a defined, hinge-like bending location of reduced cross-section at which the expansion lobe is easily able to bend. The expansion element can therefore be expanded very easily, so that only a very small axial force is necessary in order to expand the expansion element into the undercut in the drilled hole. As a result, the fixing element according to the invention can also be used in very thin structural elements, without the structural element being destroyed by the expansion of the expansion element. The remaining part of the expansion lobe can therefore be of solid construction so that it fills the undercut as completely as possible and in contact with as large a surface area as possible and the expansion lobe itself is inherently stable so that, via the expansion element, large forces can be transmitted to a load-bearing structure from a structural element being fixed.

In a preferred embodiment of the fixing element according to the invention, the opening is so configured that it penetrates the expansion lobe over a substantial portion of its surface, so that the expansion lobe consists only of a ring-like wall comprising two ribs and an engagement region that is located at the front in the direction of introduction. The wall is especially thin, which means that its thickness is small relative to the size of the opening. With such a large opening, the thickness of the material of the wall is so small that the expansion lobe can itself be deformed relatively easily. In particular, when the fixing element is set in narrow drilled holes, the deformability of the ring-like wall of the expansion lobe results in a reduction in the pressure exerted on the wall of the drilled hole by the expansion element. When the expansion lobe strikes the wall of the drilled hole with its free end, i.e. with the engagement region, the wall of the expansion lobe is compressed and deformed, with the result that the fixing element can be set more easily than a fixing element having an expansion lobe with only a small opening. It is especially advantageous for deformability if the ribs of the wall that join the ring-shaped main body to the front engagement region of the wall forming the free end are as slender as possible and are accordingly easily compressible. The slenderness of the ribs, which is defined via the ratio of their length to their width, is preferably of the order of from 1 to 4, preferably between 1.5 and 3.0.

In a preferred embodiment of the fixing element, the engagement region, which joins the ribs to one another at their front ends remote from the ring-shaped main body, is of substantially arcuate form. In this context "arcuate" can mean, in particular, that the engagement region is part of a circular ring, that is to say has a surface which is enclosed between two concentric circles. "Arcuate" describes any kind of join which has the result that the engagement region is stably formed by a kind of arch. When the arch-like engagement region strikes the wall of the drilled hole, it will be slightly deformed, but in particular the compressive force acting on the engagement region is transferred by way of the arch action to the ribs, which buckle or are compressed, so that the pressure exerted on the wall of the drilled hole is reduced. Especially in the case of slender ribs, which buckle or are compressed relatively easily and under a defined force, the expansion lobe is thus deformed in a defined way, so that the structural element is protected from destruction by pressure when the fixing element is set.

In a preferred embodiment of the fixing element according to the invention, the expansion lobe is configured in such a way that the expansion lobe tapers towards its free end. This has the advantage that the expansion lobe can be more easily deformed when it strikes the wall of the drilled hole. If, for example, the expansion lobe has ribs, those ribs are inclined relative to the wall of the drilled hole as a result of the taper. When the free end of the expansion lobe strikes the wall of the drilled hole, not only is a compressive force introduced into the ribs on the basis of the inclination but also a bending moment, with the result that the ribs are deformed by only a relatively small compressive force. This leads to a reduction in stresses resulting from the setting of the fixing element in the wall of the drilled hole when the expansion lobe is pressed against the wall of the drilled hole. It is especially advantageous for deformability if the opening also tapers towards the free end of the expansion lobe, especially if the taper of the opening corresponds to that of the expansion lobe. As a result, for example, the ribs can be of relatively slender construction.

In a further preferred embodiment of the fixing element according to the invention, a first part of an anti-rotation device is arranged on the shank portion, preferably on the expander body of the shank portion. That first part of the anti-rotation device is especially in the form of a lug-like protuberance. The lug-like protuberance is associated with the expanded expansion element in such a way that the expanded expansion element cannot rotate relative to the shank portion and in the circumferential direction thereof. Once the fixing element has been expanded in an undercut drilled hole, the friction between the wall of the drilled hole and the expanded expansion element prevents rotation of the expansion element relative to the drilled hole, and the first part of the anti-rotation device prevents rotation of the shank portion relative to the expansion element and accordingly also relative to the drilled hole or the structural element. Accordingly, for example, a nut can be screwed without difficulty onto a load-application means in the form of an external thread, for example in order to secure the fixing element to a load-bearing structure, without co-rotation of the fixing element when the nut is screwed on. For example, a ring-shaped groove, complementary to the lug-like protuberance, can be formed on the ring-shaped main body of the expansion element. In order to increase the friction between the expansion element and the wall of the drilled hole, a roughness element can be arranged on the expansion element. The roughness element is, for example, a lug-like or tooth-like projection, knurling or a groove-like depression.

The opening in the expansion lobe is preferably formed in such a way that it is complementary to the first part of the anti-rotation device and together therewith forms the anti-rotation device. The first part of the anti-rotation device, for example the lug-like protuberance, engages in the opening in the expansion lobe, which opening in this case forms the second part of the anti-rotation device, and by means of interlocking connection with the expansion element secures the shank portion against rotation in the circumferential direction. The opening in this case fulfils a double function: it allows slight expansion of the expansion element and optionally deformation of the expansion lobe and, in addition, forms the second part of the anti-rotation device. Accordingly, it is unnecessary for the expansion element to have an additional component as the second part of the anti-rotation device.

In a preferred embodiment of the fixing element according to the invention there are arranged on the main body of the expansion element at least two expansion lobes which are separated from one another in the circumferential direction by a recess. The arrangement of a plurality of expansion lobes on the ring-shaped main body allows the geometry of the expansion lobes to be matched in an optimum way to the geometry of the undercut of the drilled hole and the opening can be formed in such a way that optimum force transmission and the expansion of the expansion element with very small axial forces is possible. In particular, the arrangement of a plurality of expansion lobes distributed around the circumference on the ring-shaped main body enables the curvature of the expansion lobes in the circumferential direction, which curvature is necessary for circular bores, to be reduced to a minimum. An expansion lobe that is highly curved in the circumferential direction prevents easy expansion of the expansion element, because the expansion lobe itself has to be bent on expansion.

The recess between the at least two expansion lobes is preferably configured in such a way that the recess is complementary to the first part of the anti-rotation device. In this case the recess forms alternatively the second part of the anti-rotation device. It is especially advantageous for two different and alternative second parts of the anti-rotation device to be provided. For example, an opening can be provided in one or more expansion lobes, and recesses can be located between the expansion lobes. It is thus ensured that after only very slight rotation of the shank portion in the circumferential direction the first part of the anti-rotation device comes into contact with a second part of the anti-rotation device, which second part is complementary to the first part and together therewith forms the anti-rotation device.

In a further preferred embodiment of the fixing element according to the invention, a radially inwardly directed stop collar is arranged on the ring-shaped main body of the expansion element. This provides a defined stop point for the expansion element on the expander body of the shank portion. Preferably, a stop shoulder complementary to the stop collar is formed on the expander body. The stop shoulder, together with the stop collar, acts as a stop element and limits axial relative displacement between the expansion element and the expander body. The stop element accordingly prevents the expansion element from being pushed too far into the drilled hole and/or into the undercut by axial forces, resulting in the development of harmful stresses in the region of the wall of the drilled hole that could damage the component.

Preferably, the expansion element of the fixing element according to the invention is a stamped component, especially a stamped and bent component, made from metal. This allows simple and economical production of the expansion element and of the fixing element according to the invention.

BRIEF DESCRIPTION OF THE DRAWINGS

The invention is described in greater detail below with reference to an exemplary embodiment shown in the drawings, wherein FIG. 1 is a view of a fixing element according to the invention in an unexpanded state;

FIG. 2 is a sectional view of FIG. 1;

FIG. 3 is a perspective view of the fixing element according to the invention in a first expanded state;

FIG. 4 is a perspective view of the fixing element according to the invention in a second expanded state;

DETAILED DESCRIPTION OF THE INVENTION

Figure 5:
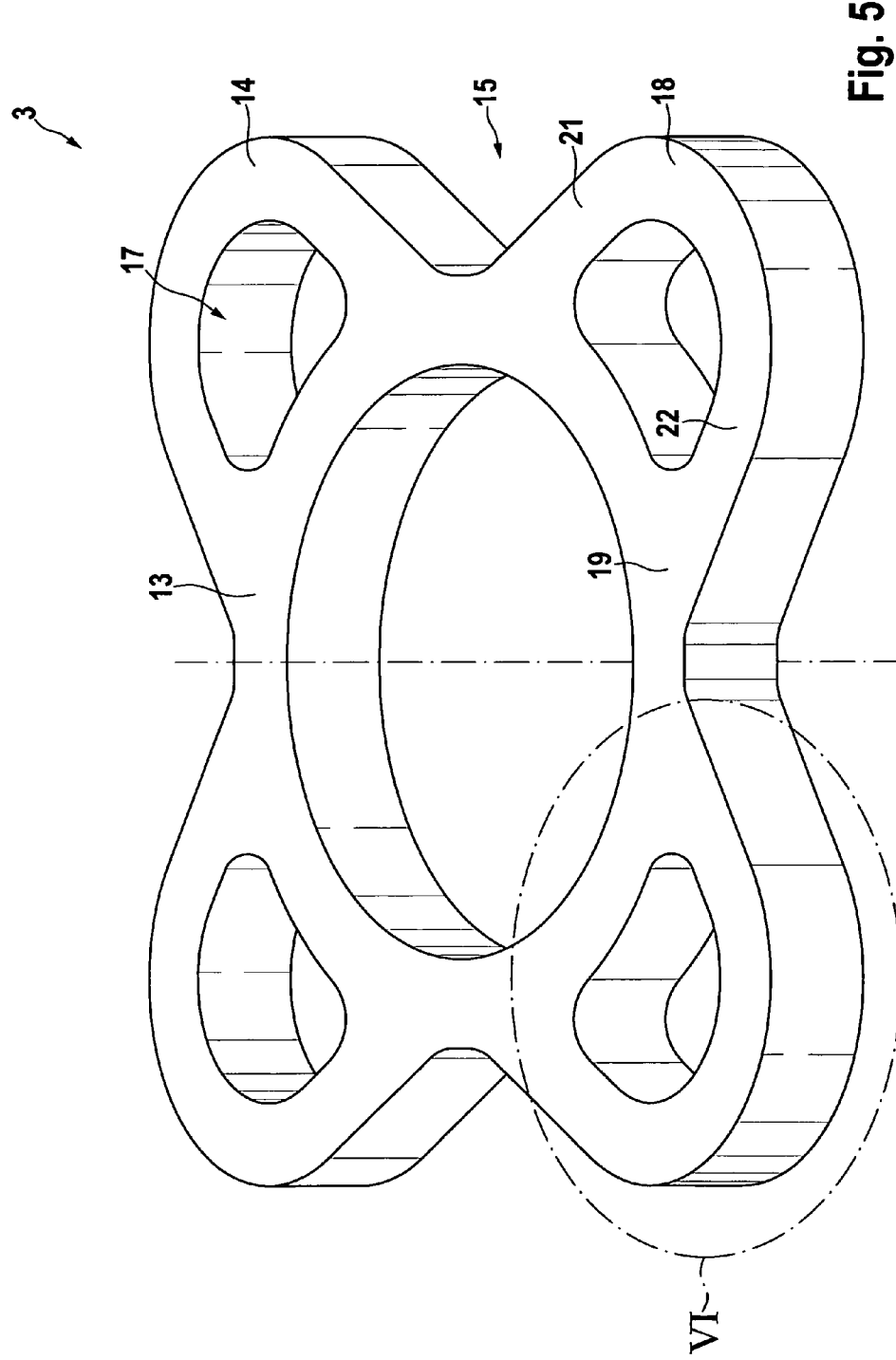
FIG. 5 is a perspective view of the expansion element in the form of a stamped component in a non-bent state.

FIGS. 1 and 2 show a fixing element 1 according to the invention in an unexpanded state, in the form in which it is insertable in the direction of introduction E into a drilled hole (not shown) having an undercut. The direction of introduction E is parallel to the longitudinal axis A of the fixing element 1. The fixing element 1 is in the form of an undercut anchor for anchoring in an undercut drilled hole (not shown). The fixing element 1 consists of a shank portion 2, an expansion element 3 and an expansion sleeve 4.

The shank portion 2 is a cone bolt having a cylindrical portion 5 and, adjoining that cylindrical portion at the introduction end, a conical portion 6 which forms the front end of the shank portion 2. The cylindrical portion 5 has a load-application means 7 in the form of an external thread. The load-application means 7 serves, for example, for securing the fixing element 1 to a load-bearing structure, which is likewise not shown. The conical portion 6 forms an expander body 8 which increases in diameter in the direction of introduction E. The expander body 8 causes the expansion element 3 to expand when the latter is pushed onto the conical portion 6 in the direction of introduction E. At the transition between the cylindrical portion 5 and the conical portion 6, the diameter of the conical portion 6 is greater than the diameter of the cylindrical portion 5, with the result that a circular annular surface is formed which projects radially beyond the cylindrical portion 5 and forms a stop shoulder 9. On the part of the conical portion 6 that is at the front in the direction of introduction there is arranged a lug-like protuberance 10 as a first part 11 of an anti-rotation device. The lug-like protuberance 10 projects bulge-like in the radial direction, that is to say perpendicular to the longitudinal axis A, beyond the outer wall 12 of the cone-like conical portion 6.

The expansion element 3 has at its rear end a ring-shaped main body 13 which encircles the cylindrical portion 5 of the shank portion 2 in the form of a closed sleeve. On the main body 13 there are arranged, at the introduction end, four expansion lobes 14 which are spaced apart from one another in the circumferential direction by recesses 15. At the rear end of the ring-shaped main body 13 there is formed a radially inwardly directed stop collar 16 which, together with the stop shoulder 9 of the shank portion 2, acts as a stop element. The expansion lobes 14 each have an opening 17 in the form of an aperture that is surrounded on all sides and is arranged approximately in the centre of the expansion lobe 14 in question. As a result of the opening 17 there is formed on the expansion lobe 14 a ring-like wall 21 having a front engagement region 18 for engagement in the undercut (not shown) of a drilled hole (likewise not shown) and having two ribs 22, each of which has a hinge-like bending location 19 that joins the engagement region 18 and the main body 13 to one another. As a result of the opening 17, the hinge-like bending locations 19 are formed in such a way that they are easily able to bend. Accordingly, a relatively small axial load directed in the direction of introduction E is sufficient to expand the expansion lobe 14, having the opening 17 and the wall 21, radially outwards as a result of the expansion element 3 being pushed onto the conical portion 6 of the shank portion 2. The engagement region 18 is sufficiently solid and stable for it to be able to transmit large forces between the wall of a drilled hole and the fixing element 1.

As a result of the relatively large opening 17, which covers a substantial portion of the area of the expansion lobes 14, the wall 21 is relatively thin and accordingly easily deformable. The wall 21 is ring-shaped with ribs 22 which are joined to one another by the arcuate engagement region 18. The ribs 22 are relatively slender, which can clearly be seen in FIGS. 5 and 6. The slenderness of the ribs 22 renders them more readily compressible. As a result of the arcuate form of the engagement region 18, a compressive force acting on the engagement region 18 when the front end of the expansion lobe 18 strikes the wall of a drilled hole is transferred to the ribs 22 via the engagement region 18. A compressive force acts in the ribs and, as a result of the spacing in the circumferential direction between the engagement region 18 and the ribs 22 and as a result of the inclination of the ribs 22, a bending moment acts additionally in the ribs 22. By virtue of the arcuate form of the engagement region 18, which is configured as part of a circular ring having an outer radius R, the engagement region 18 acts as an arch which is relatively stable. Under the action of compressive force, the engagement region 18 will deform slightly, but the compressive force is mainly transferred to the ribs 22 which, as a consequence of their slender form, are deformed under a relatively small and relatively exactly definable load. This has the advantage that any large forces acting in the direction of the longitudinal axis A, as may occur, for example, when the expansion element 3 is expanded, are not transmitted to the drilled hole by the expansion lobes 14.

Figure 6:
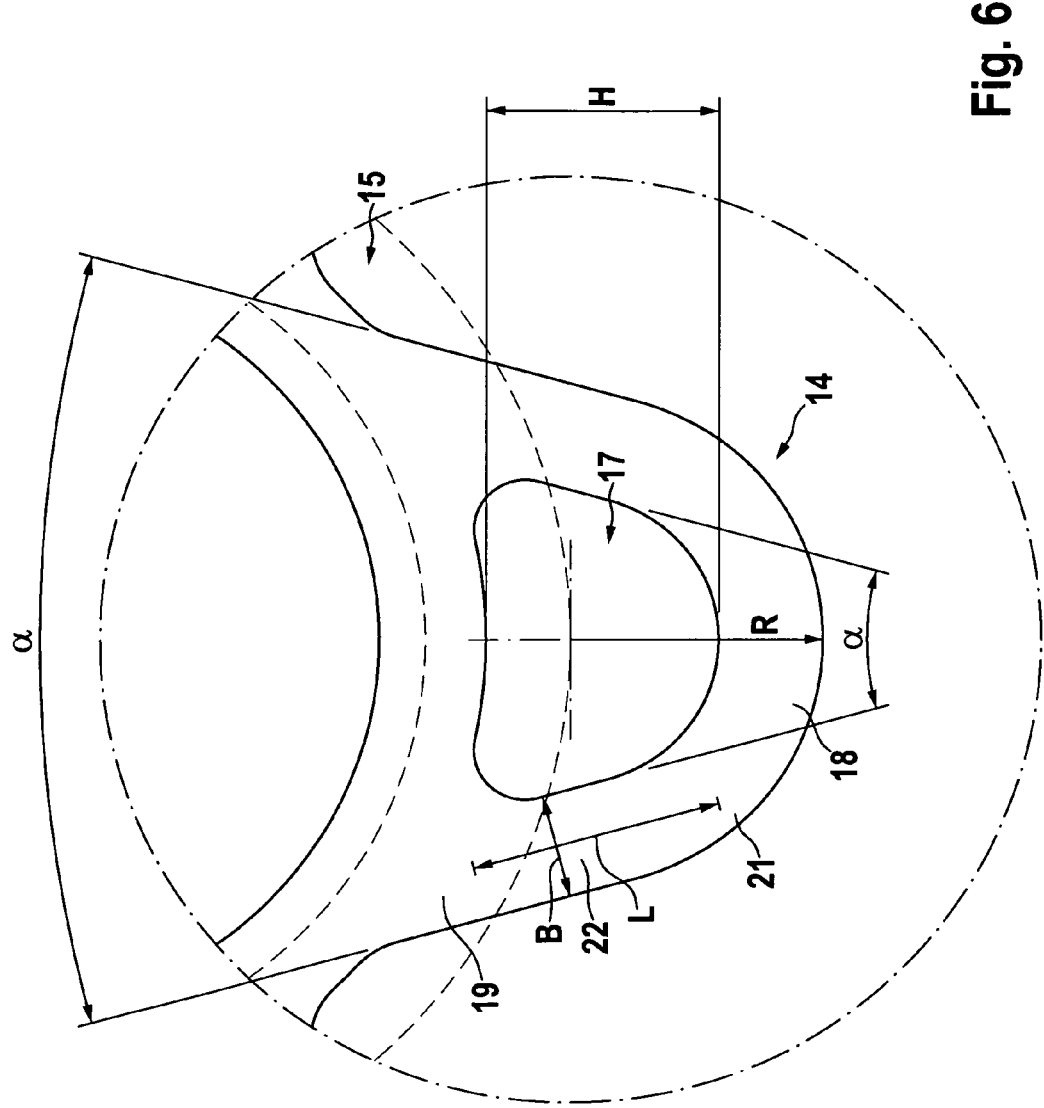
FIG. 6 is a plan view of an expansion lobe of the stamped component of FIG. 5.

Both the expansion lobe 14 and the opening 17 taper in the direction of the free end of the expansion lobe 14, that is to say in the radial direction in the case of the non-bent stamped component shown in FIGS. 5 and 6, towards the engagement region 18. The point angle α of the taper is 30°, preference generally being given to an angle of from 20° to 40°, the width B of the ribs 22 remaining substantially constant. In this case, the length L of the ribs 22 can, in simple terms, be equated with the height H of the opening 17 in the radial direction, so that the slenderness of the ribs 22, that is to say the ratio of the height H to the width B, is approximately 2.2. This promotes the deformability of the expansion lobe 14. As a result of the taper, the circular-ring-shaped engagement region 18 is relatively small and stable, whereas the ribs 22 are relatively long. Under the action of compressive force, the engagement region 18, acting as an arch, will therefore transfer the compressive force directly to the ribs 22 and generate an additional bending moment in the ribs 22. The ribs 22 are readily compressible and are deformed in a defined way. The fixing element 1 according to the invention can therefore also be used in very thin structural elements, without the structural element being destroyed by the expansion of the expansion element 1.

The expansion sleeve 4 is in the form of a hollow-cylindrical body, the cavity of which is in the form of a cylindrical bore 20 having an internal diameter substantially corresponding to the external diameter of the cylindrical portion 5 of the shank portion 2. If the expansion sleeve 4 is displaced in the direction of introduction E by an axial force applied, for example, by a hammering device (not shown), the expansion sleeve 4 exerts pressure on the expansion element 3 by way of the expander body 8 until the stop collar 16 strikes the stop shoulder 9 of the shank portion 2. Even an increase in the axial force cannot then move the expansion element 3 further in the direction of introduction E. Excessive expansion of the expansion element 3 is accordingly ruled out. As a result of the expansion element 3 being pushed onto the expander body 8, the expansion lobes 14 are spread radially outwards and in so doing are bent in the region of the hinge-like bending locations 19. The expanded state is shown in FIGS. 3 and 4.

In order that, once a fixing element 1 has been set and expanded in a drilled hole, a nut (not shown) can be screwed onto the load-application means 7, which takes the form of an external thread, without co-rotation of the fixing element 1 in the drilled hole, the fixing element 1 has an anti-rotation device. A first part 11 of the anti-rotation device is provided by the lug-like protuberance 10 on the conical portion 6 of the expander body 8. The second part of the anti-rotation device is formed either, as shown in FIG. 3, by the opening 17, which is configured in such a way that it is complementary to the lug-like protuberance 10, so that in the expanded state the opening 17 and the lug-like protuberance 10 can be brought into interlocking engagement with one another, or the recess 15 between two expansion lobes 14 acts as a second part of the anti-rotation device, as shown in FIG. 4. For that purpose, the recess 15 is configured in such a way that in the expanded state it can likewise be brought into interlocking engagement with lug-like protuberance 10. When the fixing element 1 is expanded in a drilled hole, after the expansion the lug-like protuberance 10 engages either in the opening 17 or in the recess 15. Depending upon the alignment of the expansion element 3 relative to the shank portion 2, only very slight rotational movement in the circumferential direction of the fixing element 1 is necessary until the first part 11 of the anti-rotation device engages in the second part of the anti-rotation device. Once engaged, the anti-rotation device transmits a turning moment, applied by a nut, to the wall of the drilled hole (not shown) via the expanded expansion element 3 by virtue of frictional engagement. Co-rotation of the fixing element 1 in the drilled hole is thereby reliably prevented.

The expansion element 3 of the fixing element 1 is manufactured in the form of a stamped and bent component made of metal. The shank portion 2 likewise consists of metal and is produced cost-effectively by cold working. The expansion sleeve 4, however, consists of a fibre-reinforced plastics and is produced in an injection-moulding process. The fixing element 1 according to the invention is therefore cost-effective to produce and, as a result of its shape, efficient and easy to mount.

LIST OF REFERENCE NUMERALS

Fixing Element 1 fixing element
2 shank portion
3 expansion element
4 expansion sleeve
5 cylindrical portion
6 conical portion
7 load-application means
8 expander body
9 stop shoulder
10 lug-like protuberance
11 first part of an anti-rotation device
12 outer wall
13 main body
14 expansion lobe
15 recess
16 stop collar
17 opening
18 engagement region
19 hinge-like bending location
20 bore
21 wall
22 rib
E direction of introduction
A longitudinal axis
R outer radius of the engagement region 18
B width of the rib 22
L length of the rib 22
H height of the opening 17
α point angle

The invention claimed is:

1. A fixing element for anchoring in an undercut drilled hole,
having a shank portion and an expansion element,
there being arranged on the shank portion an expander body for expanding the expansion element and a load-application means,
the expansion element being sleeve-like,
wherein
the expansion element has a ring-shaped main body,
an expansion lobe is arranged on the main body at the introduction end thereof and has an attached end and a free end, and
the expansion lobe has an opening, the expansion lobe and the opening of the expansion lobe taper towards the free end of the expansion lobe with a point angle, α, of the taper being between 20 and 40 degrees.

2. The fixing element according to claim 1, wherein the expansion lobe consists of a ring-like wall comprising two ribs and an engagement region.

3. The fixing element according to claim 1, wherein the engagement region is of substantially arcuate form.

4. The fixing element according to claim 1, wherein on the shank portion there is arranged a first part of an anti-rotation device, especially in the form of a lug-like protuberance.

5. The fixing element according to claim 4, wherein the opening in the expansion lobe is formed in such a way that it is complementary to the first part of the anti-rotation device and together therewith forms the anti-rotation device.

6. The fixing element according to claim 4, wherein on the main body there are arranged at least two expansion lobes which are separated from one another in the circumferential direction by a recess.

7. The fixing element according to claim 6, wherein the recess is configured in such a way that the recess is complementary to the first part of the anti-rotation device and together therewith forms the anti-rotation device.

8. The fixing element according to claim 1, wherein on the ring-shaped main body there is arranged a radially inwardly directed stop collar.

9. The fixing element according to claim 8, wherein on the expander body there is formed a stop shoulder which, together with the stop collar, acts as a stop element for limiting axial relative movement between the expansion element and the expander body.

10. The fixing element according to claim 1, wherein the expansion element is a stamped component, especially a stamped and bent component.

11. The fixing element according to claim 1, wherein the ring-shaped main body is itself closed.

12. The fixing element according to claim 1, wherein the taper angle is 30 degrees.

* * * * *